(12) United States Patent
Lim

(10) Patent No.: US 11,057,402 B2
(45) Date of Patent: Jul. 6, 2021

(54) PARALLELISM AND N-TIERING OF KNOWLEDGE INFERENCE AND STATISTICAL CORRELATION SYSTEM

(71) Applicant: Certis CISCO Security Pte Ltd, Certis CISCO Centre (SG)

(72) Inventor: Albert Keng Leng Lim, Certis CISCO Centre (SG)

(73) Assignee: Certis CISCO Security Pte Ltd, Certis CISCO Centre (SG)

( * ) Notice: Subject to any disclaimer, the term of this patent is extended or adjusted under 35 U.S.C. 154(b) by 478 days.

(21) Appl. No.: 16/098,826

(22) PCT Filed: May 4, 2016

(86) PCT No.: PCT/SG2016/050206
§ 371 (c)(1),
(2) Date: Nov. 2, 2018

(87) PCT Pub. No.: WO2017/192099
PCT Pub. Date: Nov. 9, 2017

(65) Prior Publication Data
US 2019/0141060 A1    May 9, 2019

(51) Int. Cl.
*H04L 29/06* (2006.01)
*G06F 21/50* (2013.01)
(Continued)

(52) U.S. Cl.
CPC .......... *H04L 63/1416* (2013.01); *G06F 21/50* (2013.01); *G06N 5/04* (2013.01);
(Continued)

(58) Field of Classification Search
CPC . H04L 63/1416; H04L 63/1408; H04L 63/20; H04L 41/147; G06F 21/50; G06N 5/04; G06N 7/08
(Continued)

(56) References Cited

U.S. PATENT DOCUMENTS 9,043,919 B2 * 5/2015 Wyatt .................. G06F 21/564
726/25
9,306,962 B1 * 4/2016 Pinto ....................... G06F 21/35
(Continued)

FOREIGN PATENT DOCUMENTS

WO    WO2006/071985 A2    7/2006

OTHER PUBLICATIONS

International Search Report from corresponding PCT Application No. PCT/SG2016/050206, dated Aug. 2, 2016, 6 pages.
(Continued)

*Primary Examiner* — Evans Desrosiers
(74) *Attorney, Agent, or Firm* — Lee & Hayes, P.C.

(57) ABSTRACT

An n-tiering security threat inference and correlation apparatus (100) for monitoring and anticipating cyber attacks is disclosed. The apparatus comprises a plurality of groups of inference-correlation systems (106(*a*, *b*)-114(*a*, *b*)), each group arranged with at least one inference system and at least one associated correlation system configured to monitor at least one network; and an input/output (I/O) system (102) configured to receive security events, and broadcast the received security events to the plurality of groups of inference-correlation systems; wherein the respective groups of inference-correlation systems are configured to process only the broadcasted security events relevant to the respective networks to identify the cyber attacks. A method of operating the apparatus is also disclosed.

12 Claims, 4 Drawing Sheets

(51) Int. Cl.
  *H04L 29/00* (2006.01)
  *G06N 5/04* (2006.01)
  *G06N 7/08* (2006.01)
  *H04L 12/24* (2006.01)
(52) U.S. Cl.
  CPC ............... *G06N 7/08* (2013.01); *H04L 29/00* (2013.01); *H04L 41/147* (2013.01); *H04L 63/1408* (2013.01); *H04L 63/20* (2013.01)
(58) Field of Classification Search
  USPC .......................................................... 726/22
  See application file for complete search history.

(56) References Cited

U.S. PATENT DOCUMENTS

| | | |
|---|---|---|
| 2004/0250133 A1 | 12/2004 | Lim |
| 2006/0174031 A1 | 8/2006 | Yamakoshi et al. |
| 2012/0096558 A1* | 4/2012 | Evrard .................. G06F 21/577 726/25 |
| 2014/0173731 A1 | 6/2014 | Mantripragada et al. |
| 2014/0317744 A1* | 10/2014 | Turgeman ............. H04W 12/06 726/23 |
| 2016/0028758 A1 | 1/2016 | Ellis et al. |

OTHER PUBLICATIONS

Written Opinion from corresponding PCT Application No. PCT/SG2016/050206, dated Aug. 2, 2016, 6 pages.

* cited by examiner

PARALLELISM AND N-TIERING OF KNOWLEDGE INFERENCE AND STATISTICAL CORRELATION SYSTEM

This Application claims the benefit under 35 U.S.C. § 371 of International Application No. PCT/SG2016/050206, filed May 4, 2016, which is incorporated herein by reference in its entirety.

FIELD

The present invention relates to an apparatus that performs parallel processing of security threat knowledge inference and statistical correlation in an n-tiering setup for monitoring and anticipating of security adversary activities for escalating risk level of high value assets.

BACKGROUND

Information security intelligence and vigilance necessitate deploying surveillance analytics and projection systems for round-the-clock non-stop surveillance of security threats and then estimate their respective threat levels from multiple input sources and knowledge domains. Stochastic models or deterministic rules are then applied to the security threats feature space to derive a reasonable and meaningful output, which is forwarded to an intelligence officer for further assessment to determine if correction/mitigation actions should be concurrently executed on the security threats as they may pose imminent risk of compromising high value information assets.

It is to be appreciated that conventional surveillance analytics and projection systems tend to utilise a wide plurality of correlation and inference techniques for identification of security threats. These correlations and inference techniques are usually executed in specific time frames using sequential mode processing of correlation criteria. These systems may also be implemented using weighted risk level or heuristic threat intelligence aggregation models. But most of such systems tend to suffer from propagation delay processing speed, and consequently leading to slow rollout of threat mitigation strategies, which may be undesirable as security threats multiply exponentially in a system such as a computer network and can quickly escalate beyond control, if not swiftly detected and addressed.

One object of the present invention is therefore to address at least one of the problems of the prior art and/or to provide a choice that is useful in the art.

SUMMARY

According to a $1^{st}$ aspect, there is provided an n-tiering security threat inference and correlation apparatus for monitoring and anticipating cyber attacks. The apparatus comprises a plurality of groups of inference-correlation systems, each group arranged with at least one inference system and at least one associated correlation system configured to monitor at least one network; and when an input/output (I/O) system configured to receive security events, and broadcast the received security events to the plurality of groups of inference-correlation systems; wherein the respective groups of inference-correlation systems are configured to process only the broadcasted security events relevant to the respective networks to identify the cyber attacks.

Advantageously, the apparatus substantially improves a speed of processing of the received security events by the inference-correlation systems to enable much faster identification of cyber attacks, as the security events are simultaneously broadcasted to all groups of inference-correlation systems which concurrently process all relevant threat inference and correlation in parallel.

Preferably, the at least one inference system may include being arranged to perform the processing based on defined inference rules to identify high value and low value events, and the inference rules are obtained from stochastic parameters that are user-customisable according to severity attributes.

Preferably, the at least one correlation system may include being arranged to perform the processing based on defined deterministic rules, which are derived from historical data for anticipating cyber attacks.

Preferably, the at least one inference system may include a plurality of inference systems, which are dynamically generated when required.

Preferably, the at least one correlation system may include a plurality of correlation systems, which are dynamically generated when required.

Preferably, the at least one inference system may include being communicatively coupled to the at least one associated correlation system.

Preferably, the at least one inference system and the at least one associated correlation system may include being configured to be logically executed in a virtual machine environment.

Preferably, the broadcasted security events may include being broadcasted as data packets respectively configured with a first identifier and a payload which includes information relating to the security events, the first identifier arranged with a unique value associated with the network to enable the respective groups of inference-correlation systems to determine and non-repudiate the broadcasted security events that are relevant for processing the payload.

Preferably, the data packets may further be configured with a second identifier to enable the at least one inference system and the at least one associated correlation system of a same group to determine whether to process the payload, subsequent to determining that the broadcasted security events are relevant.

Preferably, the data packets may be broadcasted via the User Datagram Protocol.

Preferably, at least one of the at least one inference system and the at least one associated correlation system of a same group may be configured to process the broadcasted security events.

According to a $2^{nd}$ aspect, there is provided a method of operating an n-tiering security threat inference and correlation apparatus for monitoring and anticipating cyber attacks, wherein the apparatus includes an input/output (I/O) system, and a plurality of groups of inference-correlation systems, each group being arranged with at least one inference system and at least one associated correlation system configured to monitor at least one network. The method comprises receiving security events by the I/O system; broadcasting the received security events by the I/O system to the plurality of groups of inference-correlation systems; and processing only the broadcasted security events relevant to the respective networks by the respective groups of inference-correlation systems to identify the cyber attacks.

It should be apparent that features relating to one aspect of the invention may also be applicable to the other aspects of the invention.

These and other aspects of the invention will be apparent from and elucidated with reference to the embodiments described hereinafter.

BRIEF DESCRIPTION OF THE DRAWINGS

Embodiments of the invention are disclosed hereinafter with reference to the accompanying drawings, in which.

DETAILED DESCRIPTION OF PREFERRED EMBODIMENTS

Figure 1:
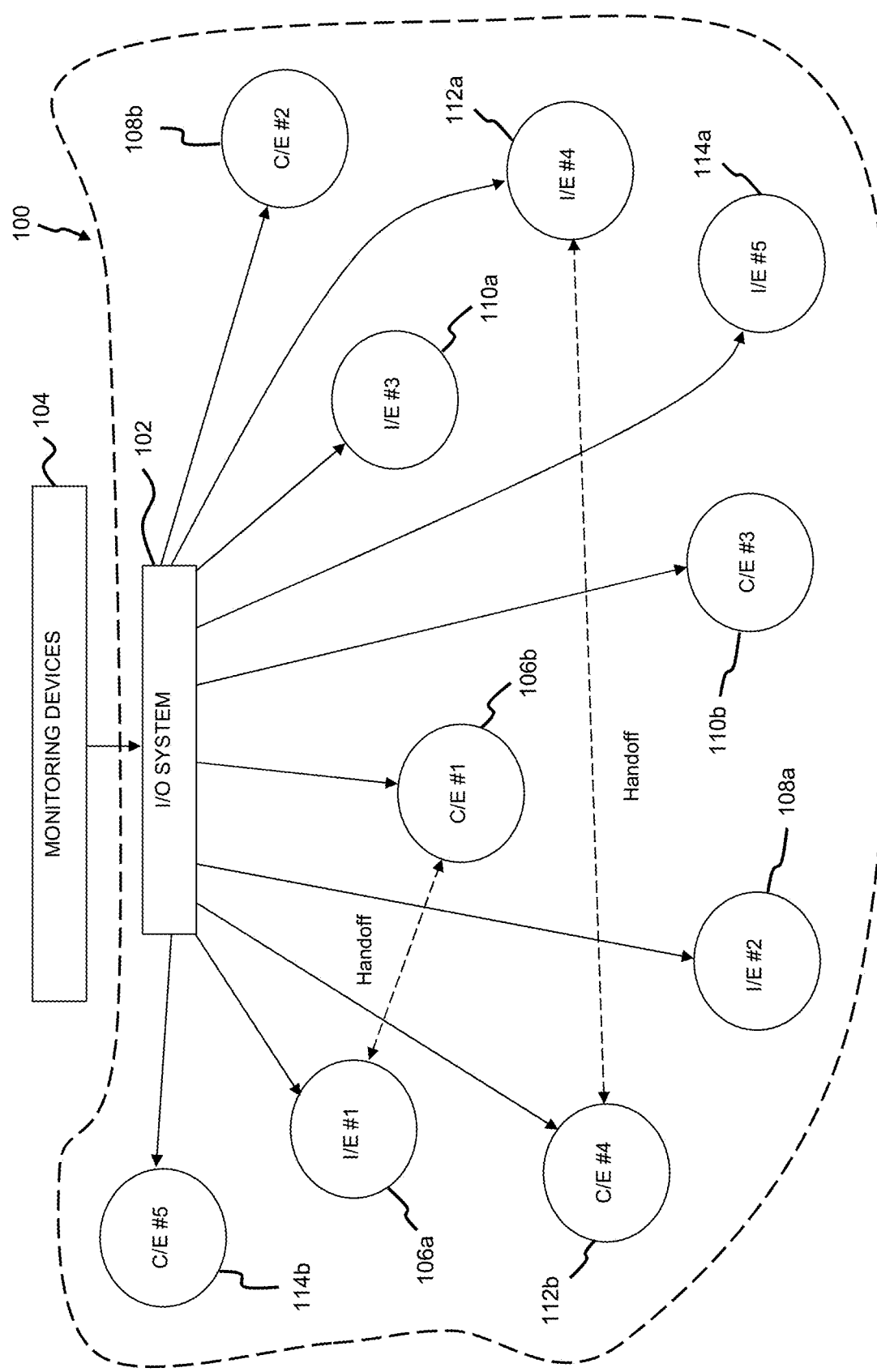
FIG. 1 is a schematic diagram of an n-tiering security threat inference and correlation apparatus for monitoring and anticipating cyber attacks, according to an embodiment.

An n-tiering security threat inference and correlation apparatus 100 for monitoring and anticipating cyber attacks, is disclosed in FIG. 1, according to an embodiment. It is to be appreciated that FIG. 1 depicts a logical arrangement setup of the apparatus 100. Broadly, the apparatus 100 includes an input/output (I/O) system 102 and a plurality of groups of inference-correlation systems 106(a, b)-114(a, b). The I/O system 102 is configured to receive security events from a plurality of monitoring devices 104 (e.g. intrusion detection systems, firewall programs, antivirus programs and etc.), which are not part of the apparatus 100. For completeness, a security event is defined as an event that may pose a real or potential threat to proper functioning of a computer system/network, at where the security event is detected. That is, the security event may constitute a cyber attack against the said computer system/network, if the threat detected turns out to be real.

For illustration purposes, an example of five groups of the inference-correlation systems 106(a, b)-114(a, b) are shown in FIG. 1, but is however not to be construed as limiting; indeed there can be as many groups of inference-correlation systems as required by the circumstances. Each group is arranged with at least one inference system 106a-114a (also known as an inference engine) and at least one associated correlation system 106b-114b (also known as a correlation engine) configured to monitor at least one network (or other computing/network assets). Within each group, the inference system 106a-114a is communicatively coupled to the associated correlation system 106b-114b. In this case, the inference system 106a-114a and the associated correlation system 106b-114b are configured to be logically executed in a virtual machine environment, which beneficially and efficiently allows all the groups 106(a, b)-114(a, b) to be run in a cloud-based environment.

It is also to be appreciated that the cloud-based environment may be hosted by a single server, or across multiple servers. That is, the apparatus 100 may be implemented in a single server, or in a plurality of servers. In the latter case, it means that there is a possibility that the I/O system 102 and the respective groups of inference-correlation systems 106(a, b)-114(a, b) can be computationally hosted in different servers (not shown) configured with different IP addresses, depending on requirements of an intended application. That is, the physical arrangement setup of the apparatus 100 may be different to the logical arrangement setup shown in FIG. 1. For example, groups one and three (i.e. having inference-correlation systems 106a, 106b, 110a, 110b) may be hosted in a first server, group five (i.e. having inference-correlation systems 114a, 114b) is hosted in a second server, groups two and four (i.e. having inference-correlation systems 108a, 108b, 112a, 112b) are hosted in a third server, and the I/O system 102 is hosted in a fourth server.

Figure 2:
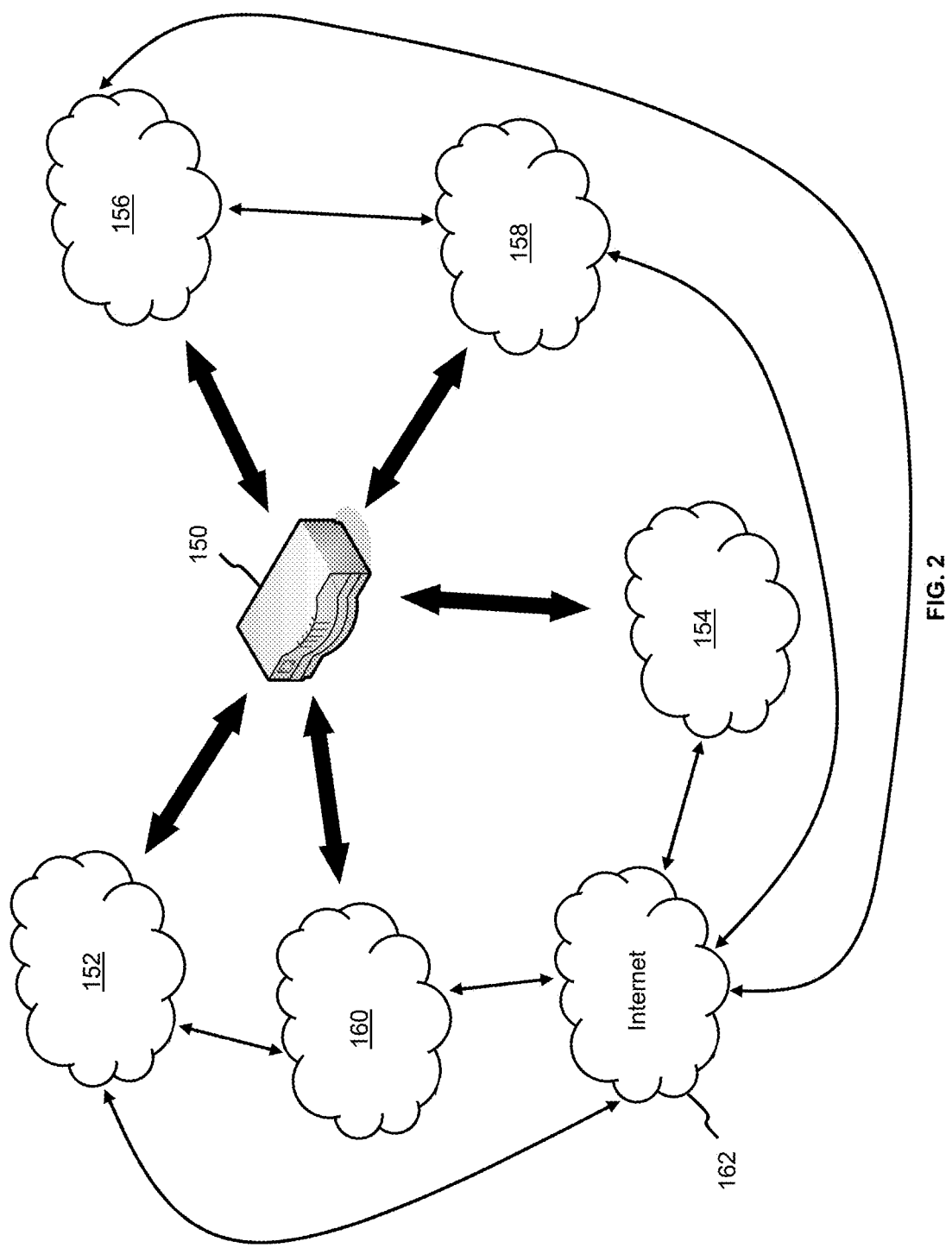
FIG. 2 is a deployment of the apparatus of FIG. 1 in hardware.

As an example, FIG. 2 shows that the apparatus 100 may be implemented in the form of a mainframe server 150 (or as a networked plurality if necessary), which hosts the cloud-based environment. The mainframe server 150 may be located in an operation surveillance center. So, the I/O system 102, and the respective groups of inference-correlation systems 106(a, b)-114(a, b) are logically hosted and executed within the mainframe server 150, and are assigned to monitor respective different networks 152-160 for threats of cyber attacks. It is to be appreciated that the networks 152-160 are preferably connected to the Internet 162 in one way or another, although that need not always be the case. In turn, the monitoring devices 104 are installed in the respective different networks 152-160, and arranged to be in communication with the I/O system 102 running on the mainframe server 150, so that security events can be received by the I/O system 102.

The apparatus 100 is adapted to use a parallelised broadcast model for monitoring and anticipating cyber attacks. Specifically, the I/O system 102 is further arranged to broadcast the received security events to the groups of inference-correlation systems 106(a, b)-114(a, b). It is highlighted that in any round of broadcasting, the broadcasted security events are meant for and directed only to a specified group, for which the security events are detected occurring on the network monitored by the said specified group. So, only the inference-correlation systems 106(a, b)-114(a, b) of the specified group will process the broadcasted security events meant for them—see elaboration below. The inference-correlation systems 106(a, b)-114(a, b) of the other groups then do not proceed to process the broadcasted security events, although the other groups will be in receipt of the broadcasted security events. Moreover, it is to be appreciated that the broadcasting arrangement utilized by the apparatus 100 is unique compared to conventional methods, in which forwarding data relating to the received security events from receipt to stages of correlation/inference is typically performed sequentially. In contrast, in this embodiment, both the inference system 106a-114a and the associated correlation system 106b-114b of an intended group receive the security events and this is another "parallel" aspect of this embodiment.

Figure 3:
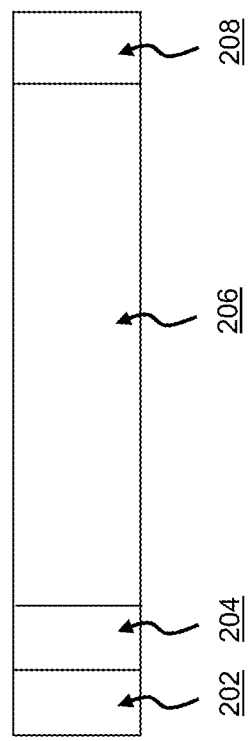
FIG. 3 shows the structure of respective data packets for broadcasting security events received by an I/O system of the apparatus of FIG. 1.

Specifically, the received security events are first formatted and then broadcasted (e.g. using the User Datagram Protocol, i.e. UDP) by the I/O system 102 as respective data packets 200 (i.e. see FIG. 3 for the structure of such a data packet 200). To clarify, the I/O system 102 is able to broadcast to a maximum of 65534 nodes on a single broadcasting channel. Each data packet 200 is configured with a first identifier 202 (i.e. a signalling flag), a second identifier 204, a payload 206 (i.e. contains information of the received security events), and a handoff flag 208. In this instance, the first identifier 202 and second identifier 204 are respectively 8-bytes long, but is not to be construed as limiting. The identifiers are derivatives of the system copy-protection public-private key process and every setup instance is unique amongst all the implementation. The first identifier 202 is written with a value (by the I/O system 102) which is preferably a customer identity of the associated network/computing asset (i.e. the customer inventory asset) monitored by one of the groups. It is also to be appreciated that the customer identity has been pre-assigned to the associated asset to be monitored, which is based on an importance level of the asset as determined by an owner of the asset. Specifically, the first identifier 202 enables the inference system 106a-114a and the associated correlation system 106b-114b of the respective groups to determine whether to process the payload 206 of the data packets 200 (i.e. the broadcasted security events). Hence, the value of the first identifier 202 is unique and varies, depending which group the data packets 200 are intended for by the I/O system 102.

For example, if the received security events are meant for group one (i.e. having the inference-correlation systems labelled with reference numerals 106a, 106b respectively) the first identifier 202 may be written with a value of "#0000001" (by the I/O system 102), which will then be recognised by the inference-correlation systems 106a, 106b of group one, when the first identifier 202 of the data packets 200 are processed. Consequently, the inference system 106a or correlation system 106b of group one then processes the payload 206 of the data packets 200—see description in next paragraph below. But for the other groups, the inference-correlation systems 108(a, b)-114(a, b) do not proceed to further process the payload 206 of the data packets 200 upon reading out the value "#0000001" in the first identifier 202, since the data packets 200 are intended for group one. Similarly, if the received security events are meant for group five (i.e. having the inference-correlation systems labelled with reference numerals 114a, 114b respectively), the first identifier 202 is now instead written with a value of "#0000005", which will then be recognised by the inference-correlation systems 114a, 114b of group five, when the data packets 200 are initially processed as discussed above. It is to be appreciated that the respective unique values linked to identities of the respective associated networks, which are to be written into the first identifier 202, are predetermined and known to the I/O system 102 and the respective groups.

Alternatively, the first identifier 202 may also be written with a non-repudiatable shared secret value associated with each group of the inference-correlation systems 106(a, b)-114(a, b). The shared secret value may, for example, be derived from a licensed key (e.g. a 22-bytes long CD key) obtained from an external security vendor. Specifically, using the licensed key, a unique shared secret value is first derived for each group, and thereafter is pre-assigned to each group, which the I/O system 102 is also being updated with. That means between the I/O system 102, and the respective groups of inference-correlation systems 106(a, b)-114(a, b), the respective shared secret values are said to be pre-negotiated prior to commencing operation by the apparatus 100. To give an example, for a data packet 200 to be broadcast to group one, the I/O system 102 encrypts the known shared secret value for group one and writes the encrypted shared secret value into the first identifier 202. Then upon receiving the data packet 200 by all the groups, the respective inference-correlation systems 106(a, b)-114(a, b) decrypts the encrypted shared secret value from the first identifier 202 and generates a hash-digest (i.e. a first hash value) of the decrypted value. Concurrently, the respective inference-correlation systems 106(a, b)-114(a, b) also generate respective hash-digests (i.e. respective second hash values) from their own shared secret values stored locally, and then compares the respective second hash values against the first hash value. If the respective second hash values match the first hash value, it then means that the data packet 200 is meant for that group—in this example, only group one's second hash value would match the first hash value.

Hence, by using the shared secret methodology in the first identifier 202, the apparatus 100 is enabled with a "self-conflict resolution" feature, in terms of allowing automatic self-configuring, matching and delivery of the broadcasted data packets 200 to the intended correct group(s) of inference-correlation systems 106(a, b)-114(a, b).

As aforementioned, the respective groups are configured to process only the broadcasted security events that are meant for an intended group, i.e. relevant to the associated network monitored by that intended group. Then, within a same group, either the inference system 106a-114a or the associated correlation system 106b-114b of the same group is configured to process the payload 206 of the data packets 200 to identify cyber attacks relevant to the associated network, once it has been determined that the data packets 200 are meant for that particular group (based on a unique value in the first identifier 202). This aspect is facilitated by further configuring each data packet 200 with the second identifier 204 (i.e. see FIG. 3), so that the inference system 106a-114a and the associated correlation system 106b-114b of the same group are able to determine whether to process the payload 206 of the received data packets 200, after determining that the data packets 200 are meant for the said group. For example, if the second identifier 204 is determined to have a value of "I/E", it means that the data packets 200 are intended for processing by the inference system 106a-114a, whereas if the second identifier 204 has a value of "CIE", it means that the data packets 200 are to be processed by the correlation system 106b-114b. Again, the possible values that may be written into the second identifier 204 are predetermined and known to the I/O system 102 and the respective groups. The above is not to be construed as limiting—it is possible that within a same group, both the inference system 106a-114a and the associated correlation system 106b-114b are also configured to process the payload 206 of the data packets 200 (i.e. see elaboration below).

If after processing the payload 206 by either the inference system 106a-114a or the associated correlation system 106b-114b, it is determined that further processing by the associated correlation system 106b-114b or the associated inference system 106a-114a (of the same group) is further required to have a more thorough analysis of the received security events, then the inference system 106a-114a or the associated correlation system 106b-114b which initially processes the payload 206 writes a first value (e.g. "HNDOFF") into the handoff flag 208 of the data packet 200 and forwards the data packet 200 to the associated correlation system 106b-114b or the associated inference system 106a-114a for further processing. The first value written into the handoff flag 208 indicates that handoff of the data packet 200 is to be performed. It is to be appreciated that if no handoff is needed, then a second value (e.g. "NULL") instead of the first value may be written. For example, if the inference system 106a of group one processes the data packet 200, and determines that further processing is needed, the inference system 106a writes the first value "HNDOFF" into the handoff flag 208 of the data packet 200 to indicate handoff of the data packet 200 is required, and then forwards the data packet 200 to the correlation system 106b of group one. Upon the correlation system 106b receiving the data packet 200 from the inference system 106a, and checking the handoff flag 208 (which is indicated as "HNDOFF"), the correlation system 106b then proceeds to process the payload 206.

Not limited to the above described, it is to be appreciated that the handoff flag 208 may also be written with the first value (e.g. "HNDOFF") or second value (e.g. "NULL") by the I/O system 102 to indicate whether handoff is required, even before the data packets 200 are broadcasted.

For completeness, the descriptions below briefly explain when the inference system 106a-114a needs to handoff a data packet 200 to the associated correlation system 106b-114b for further processing, or vice-versa. If the received security events relate to a short term cyber threats lasting not longer than a few hours (e.g. 1-4 hours), the data packets 200 would initially be processed by the correlation system 106b-114b (as dictated via the I/O system 102) to correlate and ascertain if the threat is sufficiently genuine and mitigation actions need to be taken. Once completed, if there is a further need to determine historically whether such a similar threat has also been detected in the past in relation to the asset being monitored, it is then required for the correlation system 106b-114b to handoff the data packet 200 to the associated the inference system 106a-114a for additional processing to make such a determination.

On the other hand, for received security events that may indicate presence of more persistent cyber threats (e.g. APT attacks) aimed at the network/computer asset being monitored, the data packets 200 would initially be processed by the inference system 106a-114a (as dictated via the I/O system 102) to determine if such a threat (or similar threats) has also been detected in the past on a longer timeframe to check for possible historical patterns/anomalies. Thereafter, if it is necessary to subsequently ascertain more details on the threat (e.g. to correlate with other possible security anomalies that occurred substantially around the same time on the asset being monitored), then the inference system 106a-114a may need to handoff the data packet 200 to the associated correlation system 106b-114b for further processing to enable such a determination to be made.

Figure 4:
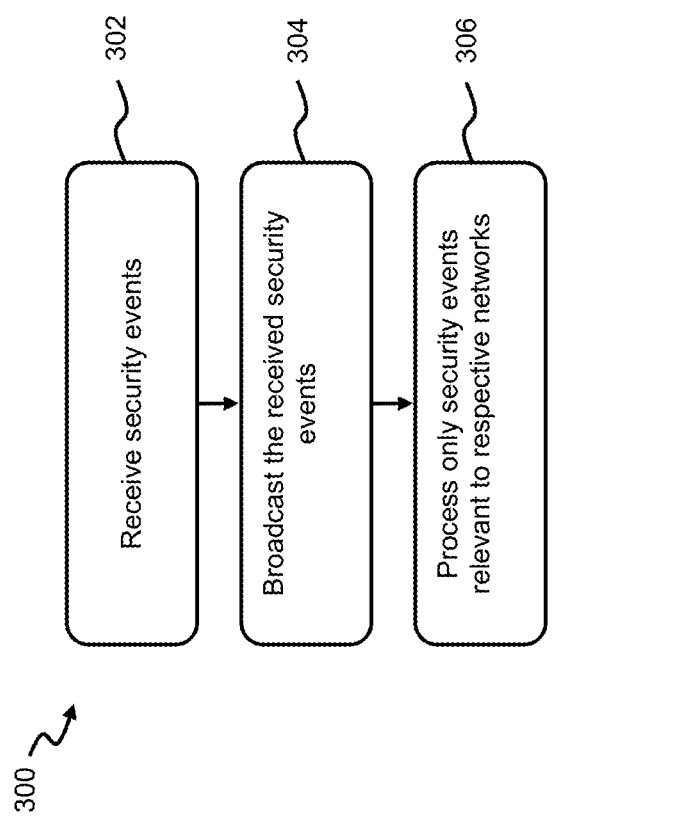
FIG. 4 is a flow diagram of a method for operating the apparatus of FIG. 1.

FIG. 4 shows a flow diagram of a method 300 for operating the apparatus 100, and broadly comprises the following steps: at step 302, receiving security events by the I/O system 102; at step 304, broadcasting the received security events by the I/O system 102 to the plurality of groups of inference-correlation systems 106(a, b)-114(a, b); and at step 306, processing only the broadcasted security events relevant to the respective networks by the respective groups of inference-correlation systems 106(a, b)-114(a, b) to identify the cyber attacks. The definition of processing in step 306 broadly means processing the data packets 200 to determine whether the data packets 200 are intended for a particular group from the first identifier 202 of the respective data packets 200, and as well as processing the payload 206 of the respective data packets 200 by the relevant group thereafter.

It is to be appreciated that intermediate to steps 302 and 304, there may be an optional step (i.e. a step 303 which is not shown) performed on the received security events to eliminate false positives and negatives using predetermined asset knowledge relating to the network/computer system being monitored and a threat-relevance dictionary, i.e. the severity of different types of threats impacting a specific asset is unique (as defined by a customer) and different, compared to the default severity definitions based on detection models from security vendors.

With respect to step 306, the inference system 106a-114a (of the respective groups) is arranged to perform processing (of the payload 206 of the data packets 200) based on defined inference rules to identify high value and low value events, and more specifically, the inference rules are obtained from stochastic parameters which are user-customisable according to severity attributes which are determined. Separately, it is also to be appreciated that an operand indicative of a confidence level (e.g. in percentage terms) may be specified during a rule setup phase of the inference system 106a-114a. Briefly, the inference system 106a-114a functions by performing statistical or rule matching of conditions of the security events filtered from step 303, permits variable triggers on attributes of a potential threat to be evaluated, and subsequently triggers necessary actions to be taken, e.g. provide a keep-on-threshold or discard the security events. Thereafter, the know-how of managing similar security threat incidents variants, together with the relevant implied threat management/handling knowledge gained after executing step 306 are to be recorded in a database (which can optionally form part of the apparatus 100). This enables future similar incidents to be automatically handled by the apparatus 100, without requiring any human intervention.

In turn, the correlation system 106b-114b (of the respective groups) is arranged to perform processing (of the payload 206 of the data packets 200) based on defined deterministic rules, which are derived from historical data (e.g. discrete and deterministic models/attributes) for anticipating cyber attacks. It is to be appreciated that the correlation system 106b-114b is arranged to provide improved granularity of detection, in comparison to the inference system 106a-114a. Generally, the correlation system 106b-114b is configured to use vertical and horizontal correlation methods, e.g. perform processing using severity attributes specified by an owner of the network/computing asset being monitored, so that alarms may be raised based on a required aggregated threat level rather than based on severity defined by detection models.

Thereafter, processed results (i.e. inferred knowledge data or correlated security events) generated by the correlation system 106b-114b or the inference system 106a-114a of the respective groups are forwarded using a Secure Transmission Protocol (SXP) to other systems of the apparatus 100 for next stage of further processing (which is not the subject of the present application). Particularly, the SXP is adapted to securely transmit the processed results using one of many high and low grade encrypted methods to the other systems of the apparatus 100.

Moreover, it is to be appreciated that the SXP can also optionally be utilised for broadcasting the received security events to the different groups of inference-correlation systems 106(a, b)-114(a, b), and in a case whereby the first identifier 202 of the data packet 200 is arranged to use the shared secret methodology, then there exists a dual-level encryption secure operation by the apparatus 100, In summary, the proposed apparatus 100, which is configured to logically run multiple instances of the inference and correlation systems 106(a, b)-114(a, b), advantageously enables all running instances of the inference and correlation systems 106(a, b)-114(a, b) to be digitally "housed and executed" under a single physical asset (e.g. the mainframe server 150) during deployment. Therefore, this substantially reduces costs of each operation surveillance center running the apparatus 100 versus conventional solutions. Further, the apparatus 100 is embodied by the following key features: (1). Parallelised broadcasts the security events to multiple inference and correlation systems 106(a, b)-114(a, b) instantaneously and concurrently within the kernel of the apparatus 100 (which may also be known as a Computer Security Event Management System); and (2). Utilises a variation of inference and correlation systems 106(a, b)-114(a, b). Accordingly, the following advantages are possible: (1). Improve a speed of the inference and correlation processes; (2). Allow collective inference and correlation results to be provided for other related security monitoring operations; and (3). Provide a formatted data source for a GUI FX feature of the apparatus 100. Moreover, in using the apparatus 100, it enables enterprises, militaries and governments to 'mix-and-match' (i.e. an AND-OR relationship) a desired n-tiering of network monitoring using inference and correlation techniques, depending on their operation theatre space.

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practising the claimed invention.

For example, the definition of the inference system 106a-114a (in each group) may include a plurality of inference systems, which are dynamically generated when required— i.e. logically spawned during runtime of the apparatus 100. It is thus possible that one correlation system 106b-114b is communicatively coupled to more than one inference system 106a-114a in a same group. In addition, among the plurality of inference systems, one system may be designated as a master system configured to aggregate security events received from different sources, with the remaining systems designated as slave systems arranged to process the aggregated security events provided by the master system.

Similarly, the definition of the correlation system 106b-114b (in each group) may include a plurality of correlation systems, which are dynamically generated when required. In other words, each group may have one inference system 106a-114a paired to many correlation systems 106b-114b. Further, amongst the plurality of correlation systems, one system may be designated as a master system arranged to receive security events from the I/O system 102, and the remaining systems are configured as slave systems to perform processing of respective work portions allocated by the master system.

Since the inference-correlation systems 106(a, b)-114(a, b) of each group may be configured in a one-to-many or many-to-many arrangement (i.e. multi-tiering configuration) for monitoring a network/computing asset, the inference-correlation systems 106(a, b)-114(a, b) may thus be flexibly and dynamically configured based on situations. Accordingly, the multi-tiering configuration of the apparatus 100 helps to substantially reduce detection of irrelevant security events and more accurately highlight occurrences of unique anomalous security incidents (i.e. incidents made up of security events).

In addition, within a same group, it is also possible that the inference system 106a-114a and the associated correlation system 106b-114b are both configured to process the payloads 206 of the data packets 200 to identify cyber attacks, since a security event can be spliced into two sites. In this case, the second identifier 204 is then written with a suitable value (e.g. "I/E&C/E") to indicate that the payloads 206 of the data packets 200 are to be processed by both the inference system 106a-114a and the associated correlation system 106b-114b of the same group. So in this manner, the apparatus 100 is configured to monitor and detect cyber attacks through combining broadcast parallelism and tasks parallelism. Furthermore, the handoff flag 208 may also be utilised in the same manner described afore in the embodiment of FIG. 1, if determined to be necessary for a particular threat situation detected by the apparatus 100.

It is also to be appreciated that broadcasting of the received security events may be performed using either multicasting (e.g. using UDP), or the Transmission Control Protocol (TCP). An advantage of using TCP, a connection-oriented protocol, to broadcast is that different security events to different groups of the inference-correlation systems 106(a, b)-114(a, b) may all be performed in parallel in a single broadcast burst, although using TCP also means that the apparatus 100 expends more computing resources to do the broadcasting due to the connection-oriented operation of TCP. Then, in using multicasting, it is also possible for the apparatus 100 to broadcast in parallel the received security events to only certain designated groups of the inference-correlation systems 106(a, b)-114(a, b) in a single broadcast burst. As a comparison, if the apparatus 100 simply broadcasts as described in the embodiment of FIG. 1, and there are different received security events to be broadcast to three different separate groups of the inference-correlation systems 106(a, b)-114(a, b), then the apparatus 100 has to broadcast the different received security events to the three different groups over three broadcast bursts, i.e. the first broadcast burst to the first group, the second broadcast burst to the second group, and the third broadcast burst to the third group. This is due to the fact that each round of broadcast burst is directed at forwarding the specific security events to an associated group, and so to finish broadcasting to three different groups, three rounds of broadcast bursts are therefore to be transmitted by the proposed apparatus 100.

In another variation, the first identifier 202 of the data packet 200 may also be written with the following two types of values: (1). A sectorial identifier based on functions (e.g. banking, shipping, transportation or the like) performed by the inventory assets of a particular customer to be monitored, or (2). A GCC (i.e. Global Command Centre) identifier, which is useful if a plurality of the proposed apparatus 100 are configured in a data farm mode for monitoring and detecting cyber attacks.

In a further variation, the proposed apparatus 100 may also utilise the first identifier 202 of the data packet 200 to perform some form of traffic throttling to save network resources, when broadcasting the data packets 200. For example, if there are a couple of security events to be broadcast to a specific group, then instead of using a few rounds of broadcast bursts to forward the security events separately, the I/O system 102 may aggregate all the security events into the data packet 200 (but provided the aggregated information of the security events may fit into the data field of the payload 206), and transmit all the security events using only a single broadcast burst intended for that specific group. As will be appreciated, this advantageously conserves valuable computing and networking resources at both the apparatus 100 and the network itself.

The invention claimed is:
1. An n-tiering security threat inference and correlation apparatus for monitoring and anticipating cyber attacks, the apparatus comprising:
one or more processors; and memory communicatively coupled to the one or more processors, the memory storing computer-excutable systems executable by the one or more processors, the computer-executable systems including:
a plurality of groups of inference-correlation systems, each group arranged with at least one inference system and at least one associated correlation system configured to monitor at least one network; and
an input/output (I/O) system configured to receive security events, and broadcast the received security events to the plurality of groups of inference-correlation systems;

wherein respective groups of inference-correlation systems are configured to process only the broadcasted security events relevant to respective networks to identify the cyber attacks; and wherein the at least one inference system includes being arranged to perform the processing based on defined inference rules to identify high value and low value events, and the inference rules are obtained from stochastic parameters that are user-customisable according to severity attributes.

2. The apparatus of claim 1, wherein the at least one correlation system includes being arranged to perform the processing based on defined deterministic rules, which are derived from historical data for anticipating cyber attacks.

3. The apparatus of claim 1, wherein the at least one inference system includes a plurality of inference systems, which are dynamically generated when required.

4. The apparatus of claim 1, wherein the at least one correlation system includes a plurality of correlation systems, which are dynamically generated when required.

5. The apparatus of claim 1, wherein the at least one inference system includes being communicatively coupled to the at least one associated correlation system.

6. The apparatus of claim 1, wherein the at least one inference system and the at least one associated correlation system include being configured to be logically executed in a virtual machine environment.

7. The apparatus of claim 1, wherein the broadcasted security events include being broadcasted as data packets respectively configured with a first identifier and a payload which includes information relating to the security events, the first identifier arranged with a unique value associated with the network to enable the respective groups of inference-correlation systems to determine whether the broadcasted security events are relevant for processing the payload.

8. The apparatus of claim 7, wherein the data packets are further configured with a second identifier to enable the at least one inference system and the at least one associated correlation system of a same group to determine whether to process the payload, subsequent to determining that the broadcasted security events are relevant.

9. The apparatus of claim 7, wherein the data packets are broadcasted via User Datagram Protocol.

10. The apparatus of claim 1, wherein at least one of the at least one inference system and the at least one associated correlation system of a same group is configured to process the broadcasted security events.

11. A method of operating an n-tiering security threat inference and correlation apparatus for monitoring and anticipating cyber attacks, the apparatus includes an input/output (I/O) system, and a plurality of groups of inference-correlation systems, each group being arranged with at least one inference system and at least one associated correlation system configured to monitor at least one network, the method comprises:

receiving security events by the I/O system;

broadcasting the received security events by the I/O system to the plurality of groups of inference-correlation systems; and processing only the broadcasted security events relevant to respective networks by respective groups of inference-correlation systems to identify the cyber attacks, wherein the at least one inference system includes being arranged to perform the processing based on defined inference rules to identify high value and low value events, and the inference rules are obtained from stochastic parameters that are user-customisable according to severity attributes.

12. The apparatus of claim 7, wherein the unique value of the first identifier includes a non-repudiatable shared secret value uniquely associated with each group of inference-correlation systems.

* * * * *